United States Patent [19]

Rohm

[11] 4,275,892
[45] Jun. 30, 1981

[54] FORCE-BALANCED LATHE CHUCK WITH SAFETY RING

[76] Inventor: Günter H. Rohm, Heinrich-Röhm-Strasse 50, 7927 Sontheim, Fed. Rep. of Germany

[21] Appl. No.: 40,271

[22] Filed: May 18, 1979

[30] Foreign Application Priority Data

May 19, 1978 [DE] Fed. Rep. of Germany ....... 2821849

[51] Int. Cl.$^3$ ............................................. B23B 31/14
[52] U.S. Cl. ..................................... 279/1 C; 279/121
[58] Field of Search ............................... 279/1 C, 121

[56] References Cited

U.S. PATENT DOCUMENTS 4,078,814  3/1978  Rohm .................................. 279/1 C Primary Examiner—W. Donald Bray
Attorney, Agent, or Firm—Karl F. Ross

[57] ABSTRACT

A lathe chuck has a chuck body rotatable about a chuck axis and carrying a plurality of angularly spaced and radially displaceable jaws each formed with an axially backwardly open jaw recess having at least one side inclined to the axis. Respective jaw actuators are axially displaceable in the chuck body and have inclined end portions engageable in the recesses for inward radial displacement of the jaws on displacement of the actuators axially forward toward axially advanced positions and for outward radial displacement of the jaws on displacement of the actuators axially backward toward partially retracted positions. In addition each actuator is displaceable axially backwardly into a fully retracted position when it is out of engagement with the respective jaw, but the actuators engage the respective jaws when in and between the advanced and partially retracted positions. Respective weights are radially slidable on the chuck between inner and outer positions and through intermediate positions. Force-transmitting pins are engaged axially between these weights and the respective jaws for conversion of radially outwardly effective centrifugal forces of the weights into radially inwardly effective forces on the respective jaws. Each of these pins is displaceable between axially advanced and partially retracted positions engageable with the respective jaw and into a fully retracted position unengageable with the respective jaw. A safety ring engages the weights and the actuators and is displaceable on the chuck between a jaw-removal position in which the actuators and pins can assume the respective fully retracted positions and a use position to prevent these actuators and the pins from moving axially backward beyond the respective fully retracted position.

10 Claims, 3 Drawing Figures

FORCE-BALANCED LATHE CHUCK WITH SAFETY RING

FIELD OF THE INVENTION

The present invention relates to a lathe chuck. More particularly this invention concerns such a chuck which is force-compensated and wherein means is provided to prevent accidental centrifugal throwing-out of the chuck jaws.

BACKGROUND OF THE INVENTION

U.S. Pat. No. 2,729,459 describes a balanced rotary power chuck having a chuck body on which a plurality of angularly equispaced jaws is radially displaceable. A central operating member is connected to the central arms of a plurality of three-arm levers each having one further arm connected to the respective jaw and another arm pivoted in a radially displaceable weight. In such an arrangement the radially outwardly effective centrifugal forces in the chuck which normally urge the jaws outwardly so as to loosen them from the workpiece or tool are compensated for by radial outward forces in the weights connected to the chuck-displacement levers which therefore serve as force-transmitting members that convert the radially outwardly effective force in the weights into a radially inwardly effective force on the jaws. This arrangement has certain advantages, yet is an extremely expensive and complex structure that has found little practical use.

Another such force-compensated chuck is described in French Pat. No. 1,008,989. Here a plurality of radially outwardly effective weights bear on an inclined surface of the operating member for the chuck jaws so that the forces that urge these jaws radially outwardly are countered by the axially directed forces on the operating member created by the weights. This arrangement, like the one described immediately above, is relatively bulky and has found little practical use.

In my earlier U.S. Pat. No. 4,026,566 a noncompensated chuck is shown wherein each of the jaws is formed with an angled recess in which engages an end part of an axially displaceable operating member. This type of jaw actuation has been found extremely effective and practical, as it not only takes up little space and can be made relatively cheaply, but it has the further considerable advantage that complete retraction of the actuators from the jaws allow them to be slid radially out of the chuck for replacement. The principal disadvantage of this structure is that excessive axial actuation of the operating member in the jaw-tightening direction can pull the actuators completely out of the recesses in the jaws, which will then immediately fly radially out of the chuck, potentially causing a serious accident.

This last-mentioned disadvantage is cured by providing a special locking-bolt structure connected to a safety ring displaceable between a jaw-removal position and a use position. In the jaw-removal position the locking bolt can be retracted out of the way of the jaw so that it can be displaced radially out of the chuck. In the use position the bolt blocks such radial outward displacement of the respective jaw so that, even if the actuators are pulled out of the recesses in the jaws, these jaws cannot move radially out of the chuck. Nonetheless this system is relatively complicated and entails considerable manufacturing expense.

In another of my earlier patents, namely U.S. Pat. No. 4,078,814, the same type of axially displaceable actuator engaged in a jaw recess is used. Here, in addition, a safety ring is provided which prevents the actuators from moving fully radially out of the chuck in the use position. This arrangement also has pivotal counterweights that can bear axially on pins that engage radially inwardly on the jaws to counteract the centrifugal outward force effective thereon. These pins, when the chuck is rotated at high speed, serve to radially lock in the jaws also as a further safety arrangement.

This last-mentioned device has proven rather difficult to use as a result of the pivotal counterweights. What is more it has been found that an occasional failure results in breaking off of the upper end of the actuator, in which case the respective chuck jaw can move radially out of the chuck, creating a very serious accident hazard. Another disadvantage of this and the other above-described known systems is that an operator will occasionally assume that the actuators are properly engaged in the backs of the jaws of the chuck when this is not the case, and will therefore start up the lathe when in fact the actuators are not properly engaged in their respective jaws. In this situation the force-conversion pin does not have time during startup to displace itself axially into radial line with the respective jaw so as to prevent it from flying out of the chuck.

OBJECTS OF THE INVENTION

It is therefore an object of the instant invention to provide an improved force-compensated safety chuck.

Another object is to provide such a chuck which is relatively simple in construction, yet which can be used with a higher degree of safety than any of the other above-described chucks.

SUMMARY OF THE INVENTION

These objects are attained according to the instant invention in a lathe chuck of the above-described type having a chuck body rotatable about a chuck axis provided with a plurality of angularly spaced and radially displaceable jaws each formed with an axially open jaw recess having at least one side inclined to the axis. Means is provided including respective jaw actuators axially displaceable in the chuck body and having inclined end portions engageable in these jaw recesses for inward radial displacement of the jaws on displacement of the actuators axially forward toward axially advanced positions and for outward radial displacement of the jaws on displacement of the actuators axially backward toward partially axially retracted positions. Each of these actuators is further axially displaceable backwardly into axially fully retracted position out of engagement with the respective jaw. The actuators engage the respective jaws when they are in and between the advanced and partially retracted positions. Respective weights radially displaceable on the chuck between inner and outer positions and through intermediate positions are engageable via respective force-transmitting members with the respective jaws. These force-transmitting members convert the radially outwardly effective centrifugal force of the weights into radially effective forces on the respective jaws. Each of these force-transmitting members is displaceable between axially advanced and partially retracted positions engageable with the respective jaw and into a fully retracted position unengageable with the respective jaw. Means is provided including an element operatively engaging the members and the actuators and displaceable on the chuck between a jaw-removal position in which the actuators and the members can assume the respective fully retracted positions, and a use position for preventing the actuators and members from moving axially backwardly beyond the respective partially retracted positions into the respective fully retracted positions. The element is in fact directly engageable with the actuators and with the weights and is operatively engageable through the weights with the respective force-transmitting members.

Thus with the system of the instant invention an extremely simple force-conversion system is provided which ensures force-compensation to eliminate the effects of centrifugal force on the chuck jaws by opposing this centrifugal force with that of the normally heavier weights. At the same time the actuators are prevented from being withdrawn from the jaws except when the safety element, normally a ring, is in the jaw-removal position. This safety ring also prevents the force transmitting members from being axially withdrawn into a position allowing the jaws to be radially removed, so that even when the actuator fails the force-transmitting members will hold the jaws in place.

According to further features of this invention each of the force-transmitting members is an axially displaceable pin having one end engageable with the respective jaw and another end engageable with the respective weight, both of which are radially slidable on the chuck body. The ends of the force-transmitting pins are beveled and the weights and jaws have surfaces engageable flatly with the respective beveled ends. This structure can be built in an extremely limited space and at relatively low cost. Furthermore, the simplicity of this arrangement minimizes equipment failure.

In accordance with further features of this invention springs are provided both to urge the force-transmitting members axially backwardly into their retracted positions and to urge the weights into their radial inner positions. The springs for the weights have a spring force which is greater than the weight of the weights, but which is less than the centrifugal force normally encountered during rotation of the chuck in machining. In this manner when the chuck is at a standstill the force-transmitting members will withdraw at least to their partially retracted positions, and when the safety ring is in the jaw-removal position the force-transmitting members will automatically withdraw fully. Thus even though radial outward withdrawal of the jaws is prevented according to this invention by two separate elements, thereby doubling the safety of the chuck, removing of the jaws is stll no more complex than in the standard safety chuck.

SPECIFIC DESCRIPTION

Figure 1:
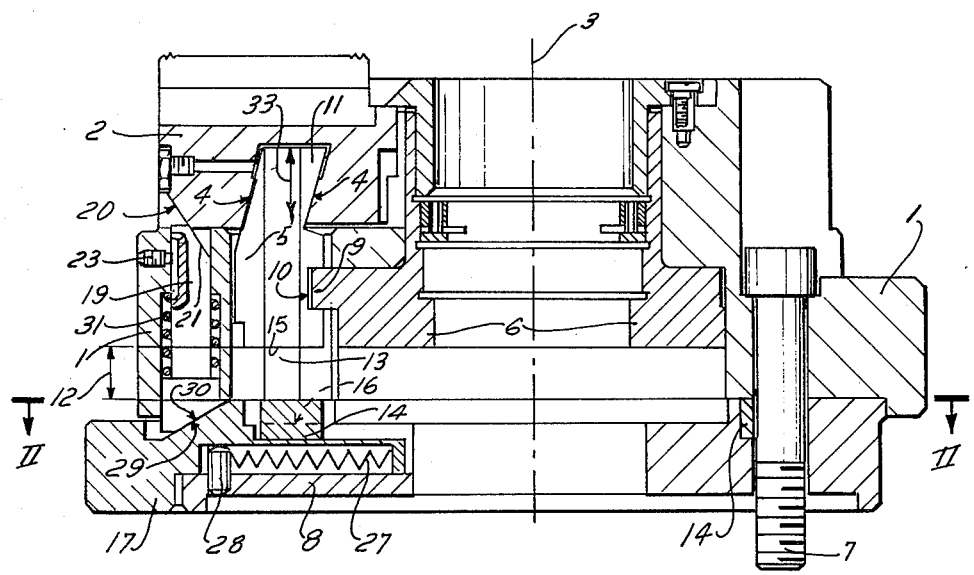
FIG. 1 is an axial section through a chuck according to this invention.
Figure 3:
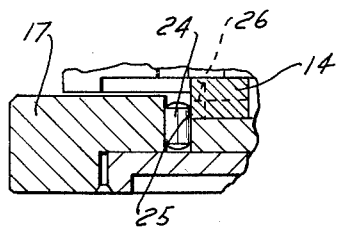
FIG. 3 is an axial section through the chuck of the present invention.
Figure 2:
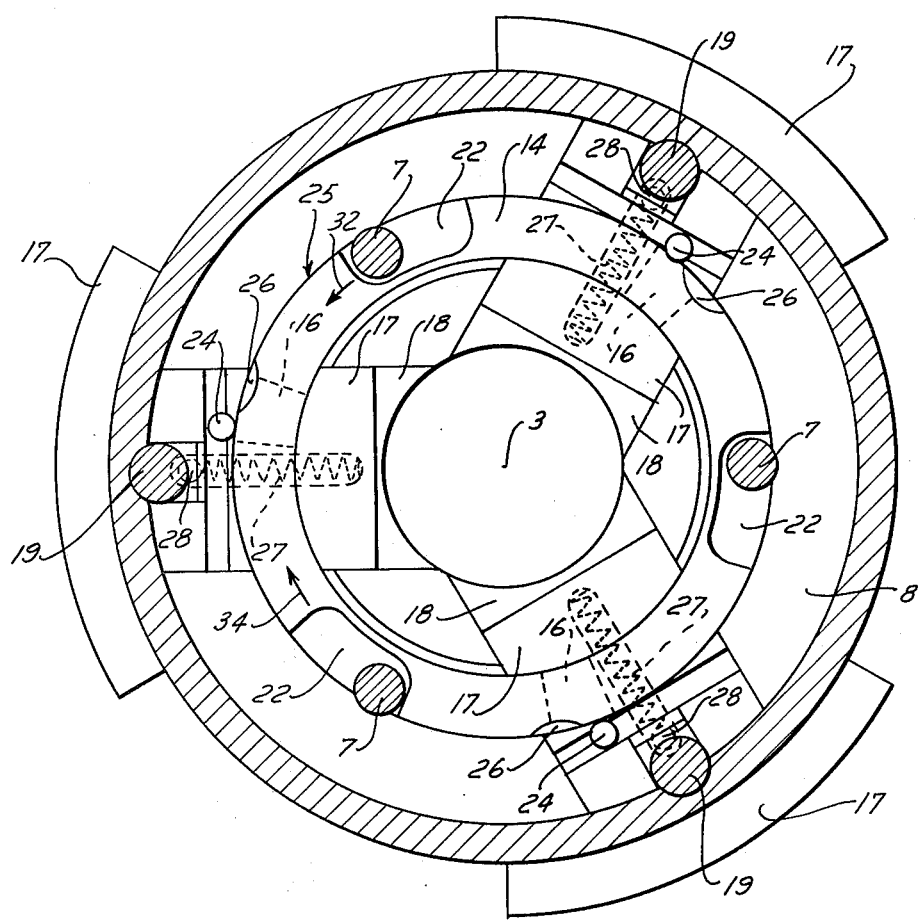
FIG. 2 is a section taken along II—II of FIG. 1.

As shown in FIGS. 1-3 a chuck according to this invention has a chuck body 1 normally mounted on the head stock of a lathe by means of bolts 7 for rotation about a chuck axis 3. This chuck body 1 carries three angularly equispaced jaws 2 that are radially displaceable on the chuck body 1 and that may be provided with jaws blanks, but are otherwise of the so-called nonsplit type. Each of these jaws 2 is formed on its rear face with a conventional inclined recess 4 in which an inclined end 11 of an actuator 5 engages. The actuators 5 are formed with axially inwardly open square-section notches 10 receiving a flange 9 of an operating member 6 that is connected to a hydraulic cylinder of the power chuck. This member 6 may alternatively be formed simply as the piston of a hydraulic cylinder built directly into the chuck body 1. Each of the actuators 5 is received in a pair of guides 13 that allow it to move only axially in the chuck body 1.

A safety ring 14 carried between the chuck body 1 and a mounting plate 8 thereof is limitedly rotatable about the axis 3, to an extent determined by the angular dimension of notches 22 formed in this ring 14 and receiving the bolts 7 that attach the body 1 to the lathe headstock. This ring 14 is formed with three angularly equispaced and axially forwardly open notches 16 in which the rear ends 15 of the actuators 5 are engageable in a jaw-removal position of this ring 14. When the axially open notches or recesses 16 are not aligned with the respective rear ends 15 of the actuators 5 these actuators 5 can only move through an axial stroke 12 which is axially shorter than the axial overlap 33 of the end pieces 11 of the actuators 5 in the recesses 4. For this reason when the actuators 5 are not aligned with the notches 16 they normally cannot pull out of the recesses 4 and decouple themselves from the respective jaws 2.

Radially slidable in guide grooves 18 on the plate 8 are weights 17, each axially behind a respective jaw 2. These weights 17 are of considerably greater mass than the jaws 2 and each have an inclined surface 30 engaging an inclined end surface 29 of an axially extending force-transmitting element or pin 19 having an opposite axial and end 21 engageable flatly with a complementarily beveled or inclined surface 20 of the respective jaw 2. Each of these force-transmitting or force-converting pins 19 has an axial stroke limited by a screw 23 engaging in an axially limited groove in its side. Compression springs 31 each engage between an enlarged head of a respective pin 19 and a shoulder of the bore receiving this pin 19 to urge it axially backwardly. Similarly each of the weights 17 is biased radially inwardly by a respective compression spring 27 bearing at its radial outer end against a pin 28 fixed in the mounting plate 8.

In addition, as best seen in FIG. 2, the ring 14 is formed adjacent each of the axially upwardly open notches 16 with a radially outwardly open notch 26. Furthermore, each weight 17 has an axially downwardly projecting pin 24 that normally rides on the cylindrical outer periphery 25 of the ring 14 to one side of the respective radially outwardly open notch 26.

The actuators 5 are shown in FIGS. 1-3 in the fully advanced positions so that the jaws 2 are in the radial innermost positions. The counterweights 17 are in a radially intermediate position, that is almost fully radially retracted. The force-transmitting pins 19 are axially partially retracted also.

In use the operating member 6 is normally displaced axially, upwardly as seen in FIG. 1, to displace the jaws 2 inwardly to clamp a workpiece or tool. Then the entire chuck is rotated at high speed about the axis 33. This high-speed rotation will overcome the forces of the springs 27 and drive the weights 17 outwardly. The surfaces 29 of these weights 17 will therefore cam the pins 19 upwardly so that their surfaces 21 will push against the surfaces 20 and urge the jaws radially inwardly. As the weights 17 each are considerably heavier than the respective jaws 2, the centrifugally outwardly effective forces on these weights 17 will more than overcome the radially outwardly effective centrifugal forces on the respective jaws 2.

When the chuck is stopped the force-transmitting pins 19 and weights 17 will return under the force of their springs 31 and 27 to the positions illustrated in FIGS. 1 and 3. In this position the pins 19 still prevent radial outward displacement of the jaws 2, as the extreme upper ends of these pins 19 still axially overlap the corresponding portions of the surface 20.

In order to remove the jaws 2 from the chuck body 1 the ring 14 is rotated in the direction 32 (FIG. 2) to align the notches 16 with the rear faces 15 of the actuators 5, and to radially align the notches 26 with the pins 24. In this position the actuators 5 will be able to move downwardly into an axially fully retracted position, completely pulling the ends 11 out of the recesses 4. In addition, the weights 17 will be urged by their spring 27 into radially inner or fully retracted positions that will allow the pins 19 to drop down under the force of their springs 31 so that their upper ends will move completely axially out of the way of the jaws 2.

In this position the jaws 2 can be removed and replaced by simply sliding them radially out of the chuck body 1.

In order to exchange jaws, the new jaws are slid radially in place and the operating member 6 is advanced to engage the ends 11 of the actuators 5 inside the recesses 4. The member 6 is then drawn upwardly to displace jaws 2 radially fully inwardly, and then the ring 14 is rotated in a direction 34 (FIG. 2) opposite the direction 32 to cam the weights 17 outwardly and, therefore, cam the pins 19 axially upwardly so as to block radial outward displacement of the jaws 2 beyond the position shown in FIG. 1. Thereafter the chuck can be used in the normal manner. With the chuck according to the instant invention, therefore, the jaws must be mounted in place in accordance with a procedure which ensures that they will always be accurately held. Even if the ends 11 break off the actuators 5, the jaws 2 will be held in place by the force-transmitting pins 19. The entire assembly has a relatively reduced dimension and can be produced at a relatively low cost.

I claim:

1. A lathe chuck comprising:
   a chuck body rotatable about a chuck axis;
   a plurality of angularly spaced and radially displaceable jaws on said body each formed with an axially backwardly open jaw recess having at least one side inclined to said axis;
   means including respective jaw actuators axially displaceable in said chuck body and having inclined end portions engageable in said recesses for inward radial displacement of said jaws on displacement of said actuators axially forwardly toward axially advanced positions and for outward radial displacement of said jaws on displacement of said actuators axially backwardly toward partially axially retracted positions, each actuator further being displaceable axially backwardly into an axially fully retracted position out of engagement with the respective jaw, said actuators engaging the respective jaws in and between said advanced and partially retracted positions;
   respective weights radially displaceable on said chuck between inner and outer positions and through intermediate positions;
   means including respective force-transmitting members engaged between said weights and the respective jaws for conversion of radially outwardly effective centrifugal forces of said weights into radially inwardly effective forces on the respective jaws, each force-transmitting member being displaceable between axially advanced and partially retracted positions engageable with the respective jaw and into a fully retracted position unengageable with the respective jaw; and
   means including an element operatively engaging said members and actuators and displaceable on said chuck between a jaw-removal position in which said actuators and members can assume the respective fully retracted positions, and a use position for preventing said actuators and members from moving axially backwardly beyond the respective partially retracted positions into the respective fully retracted positions.

2. The chuck defined in claim 1 wherein said element is directly engageable with said actuators and with said weights, and is operatively engageable through said weights with the respective force-transmitting members.

3. The chuck defined in claim 2 wherein each of said force-transmitting members is an axially displaceable pin having one end engageable with the respective jaw and another end engageable with the respective weight.

4. The chuck defined in claim 3 wherein said ends are beveled and said weights and jaws have surfaces engageable with the respective ends and complementarily beveled relative thereto.

5. The chuck defined in claim 3, further comprising respective springs urging said force-transmitting members axially backwardly.

6. The chuck defined in claim 2 wherein said element is a ring, said weights being displaceable into the respective inner positions only in said jaw-removal position of said ring.

7. The chuck defined in claim 6 wherein said ring is formed with radially outwardly directed cutouts alignable with said weights in said jaw-removal position and with axially forwardly directed cutouts alignable with said actuators in said jaw-removal position.

8. The chuck defined in claim 1 wherein said force-transmitting members are radially inwardly engageable with the respective jaws.

9. The chuck defined in claim 1, further comprising an operating member axially fixed to all of said actuators for jointly axially displacing same.

10. A lathe chuck comprising:
    a chuck body rotatable about a chuck axis;
    a plurality of angularly spaced and radially displaceable jaws on said body each formed with an axially backwardly open jaw recess having at least one side inclined to said axis;
    means including respective jaw actuators axially displaceable in said chuck body and having inclined end portions engageable in said recesses for inward radial displacement of said jaws on displacement of said actuators axially forwardly toward axially advanced positions and for outward radial displacement of said jaws on displacement of said actuators axially backwardly toward partially axially retracted positions, each actuator further being displaceable axially backwardly into an axially fully retracted position out of engagement with the respective jaw, said actuators engaging the respective jaws in and between said advanced and partially retracted positions;

respective weights radially slidable on said chuck between inner and outer positions and through intermediate positions;

respective springs urging said weights radially inwardly with respective spring forces greater than the weights of the respective weights but smaller than the normally encountered radially outwardly effective forces of said weights when said chuck is in use;

means including respective force-transmitting members engaged between said weights and the respective jaws for conversion of radially outwardly effective centrifugal forces of said weights into radially inwardly effective forces on the respective jaws, each force-transmitting member being displaceable between axially advanced and partially retracted positions engageable with the respective jaw and into a fully retracted position unengageable with the respective jaw; and means including an element operatively engaging said members and actuators and displaceable on said chuck between a jaw-removal position in which said actuators and members can assume the respective fully retracted positions, and a use position for preventing sait actuators and members from moving axially backwardly beyond the respective partially retracted positions into the respective fully retracted positions.

* * * * *